(12) United States Patent
Xia et al.

(10) Patent No.: US 12,411,586 B2
(45) Date of Patent: Sep. 9, 2025

(54) TOUCH FUNCTIONAL COMPONENT, DISPLAY PANEL, AND DISPLAY APPARATUS

(71) Applicant: KunShan Go Visionox Opto Electronics Co., Ltd, Jiangsu (CN)

(72) Inventors: Peng Xia, Jiangsu (CN); Shuai Lin, Jiangsu (CN); Yule Dou, Jiangsu (CN)

(73) Assignee: KunShan Go Visionox Opto Electronics Co., Ltd, Kunshan (CN)

( * ) Notice: Subject to any disclaimer, the term of this patent is extended or adjusted under 35 U.S.C. 154(b) by 63 days.

(21) Appl. No.: 18/606,520

(22) Filed: Mar. 15, 2024

(65) Prior Publication Data

US 2024/0220059 A1     Jul. 4, 2024

Related U.S. Application Data

(63) Continuation of application No. PCT/CN2022/122751, filed on Sep. 29, 2022.

(30) Foreign Application Priority Data

Jul. 25, 2022   (CN) .......................... 202210879925.2

(51) Int. Cl.
*G06F 3/044*    (2006.01)
(52) U.S. Cl.
CPC .......... *G06F 3/0448* (2019.05); *G06F 3/0446* (2019.05); *G06F 2203/04111* (2013.01)

(58) Field of Classification Search
CPC ................ G06F 3/0448; G06F 3/0446; G06F 2203/04111; G06F 3/041; G06F 3/0443; G06F 3/044

See application file for complete search history.

(56) References Cited

U.S. PATENT DOCUMENTS

| | | | |
|---|---|---|---|
| 8,698,767 B2 * | 4/2014 | Kwak ................... | G06F 3/0448 |
| | | | 178/18.05 |
| 2012/0105343 A1 | 5/2012 | Lee et al. | |
| 2018/0108710 A1 * | 4/2018 | Lin ..................... | H10K 59/1216 |
| 2020/0192543 A1 * | 6/2020 | Wang ..................... | G06F 3/047 |
| 2021/0286472 A1 * | 9/2021 | Gong .................... | G06F 3/0448 |

(Continued)

FOREIGN PATENT DOCUMENTS

| | | |
|---|---|---|
| CN | 103970335 A | 8/2014 |
| CN | 107301003 A | 10/2017 |

(Continued)

OTHER PUBLICATIONS

Office Action issued on Jun. 17, 2025, in corresponding Chinese Application No. 202210879925.2, 17 pages.

(Continued)

*Primary Examiner* — Antonio Xavier
(74) *Attorney, Agent, or Firm* — Maier & Maier, PLLC

(57) ABSTRACT

A touch functional component, a display panel, and a display apparatus. The touch functional component includes: first electrodes; second electrodes; first connection bridges, at least one of which electrically connects an electrode protrusion of one first electrode with an electrode body of the other first electrode; and second connection bridges, at least one of which electrically connects a first electrode structure with a second electrode structure of the second electrode.

19 Claims, 14 Drawing Sheets

(56) References Cited

U.S. PATENT DOCUMENTS

2022/0317811 A1* 10/2022 Wang ................... G06F 3/0448
2023/0119216 A1* 4/2023 Ye ........................ G06F 3/0448
                                                    345/174

FOREIGN PATENT DOCUMENTS

| CN | 207611365 U | 7/2018 |
| CN | 103970335 B | 9/2018 |
| CN | 109388294 A | 2/2019 |
| CN | 109669573 A | 4/2019 |
| CN | 110764659 A | 2/2020 |
| CN | 113064523 A | 7/2021 |
| CN | 113485577 A | 10/2021 |
| CN | 114115607 A | 3/2022 |
| WO | 2021147708 A1 | 7/2021 |

OTHER PUBLICATIONS

International Search Report issued Mar. 11, 2023, in corresponding International Application No. PCT/CN2022/122751; 6 pages.

* cited by examiner

TOUCH FUNCTIONAL COMPONENT, DISPLAY PANEL, AND DISPLAY APPARATUS

CROSS-REFERENCE TO RELATED APPLICATIONS

The present application is a continuation of International Application No. PCT/CN2022/122751, which is filed on Sep. 29, 2022 and claims priority to Chinese Patent Application No. 202210879925.2, entitled "TOUCH FUNCTIONAL COMPONENT, DISPLAY PANEL, AND DISPLAY APPARATUS" and filed on Jul. 25, 2022, both of which are incorporated herein by reference in their entireties.

TECHNICAL FIELD

The present application belongs to the field of display technology, and in particular, relates to a touch functional component, a display panel, and a display apparatus.

BACKGROUND

With the continuous development of display technology, display apparatuses play an increasingly important role in people's work, life, and learning. Display panels with touch functions have been greatly popularized. The display panels have touch functional components for implementing the touch functions. The touch functional component includes a sensing electrode and a driving electrode, and the impedance of the sensing electrode greatly differs from that of the driving electrode. As a result, the transmission speed of an electrical signal transmission channel of the electrode with higher impedance is slower, which reduces the response speed to operations of the display panel with the touch function.

SUMMARY

Embodiments of the present application provide a touch functional component, a display panel, and a display apparatus, which can improve the response speed to operations of a display panel with a touch function.

In a first aspect, an embodiment of the present application provides a touch functional component, including: first electrodes, where a plurality of the first electrodes are successively distributed in a first direction, at least one first electrode in two adjacent first electrodes includes an electrode body and an electrode protrusion, and in a same first electrode, the electrode body extends in the first direction to form the electrode protrusion, or the electrode body is in contact connection with the electrode protrusion, where two adjacent first electrodes include two or more electrode protrusions, and an accommodating area is formed between the two adjacent electrode protrusions: second electrodes, extending in a second direction and at least one of the second electrodes including a first electrode structure located in the accommodating area and second electrode structures located on two sides of the accommodating area, where the second electrode structures bypass the electrode protrusions and extend towards the accommodating area to form the first electrode structure, or the second electrode structures bypass the electrode protrusions and extend towards and are in contact connection with the first electrode structure: first connection bridges, at least one of the first connection bridges electrically connecting the electrode protrusion of one of two adjacent first electrodes with the electrode body of the other first electrode; and second connection bridges, at least one of the second connection bridges electrically connecting the first electrode structure with the second electrode structure, where an orthographic projection of the second connection bridge overlaps at least partially with that of the electrode protrusion.

In a second aspect, an embodiment of the present application provides a display panel, including the touch functional component in the first aspect.

In a third aspect, an embodiment of the present application provides a display apparatus, including the display panel in the second aspect.

The embodiments of the present application provide a touch functional component, a display panel, and a display apparatus. The touch functional component includes first electrodes, second electrodes, first connection bridges, and second connection bridges. In two adjacent first electrodes, at least one first electrode includes an electrode body and an electrode protrusion, and in a same first electrode, the electrode body extends in a first direction to form the electrode protrusion, or the electrode body is in contact connection with the electrode protrusion. The two adjacent first electrodes include two or more electrode protrusions. The second electrode includes a first electrode structure located between the two adjacent electrode protrusions and second electrode structures located on two sides of the first electrode structure. The second electrode structures bypass the electrode protrusion and extend towards the accommodating area to form the first electrode structure, or the second electrode structures bypass the electrode protrusion and extend towards and are in contact connection with the first electrode structure. The first connection bridge electrically connects the electrode protrusion of one first electrode with the electrode body of the other adjacent first electrode. The second connection bridge electrically connects the first electrode structure with the second electrode structure. In the two adjacent first electrodes, the electrode bodies, the electrode protrusions, and the first connection bridges may form two or more parallel branches. In the second electrode, the first electrode structure and the second electrode structures may form two or more parallel branches. The structure of an electrical signal transmission channel of the first electrodes is substantially consistent with that of an electrical signal transmission channel of the second electrode, and the parallel connection of branches in the electrical signal transmission channels reduces the impedance of the first electrode and the impedance of the second electrode, which can ensure that the transmission speed of the electrical signal transmission channel of the first electrodes and the electrical signal transmission speed of the second electrode are faster, thereby improving the response speed to operations of the display panel including the touch functional component.

DETAILED DESCRIPTION

Figure 1:
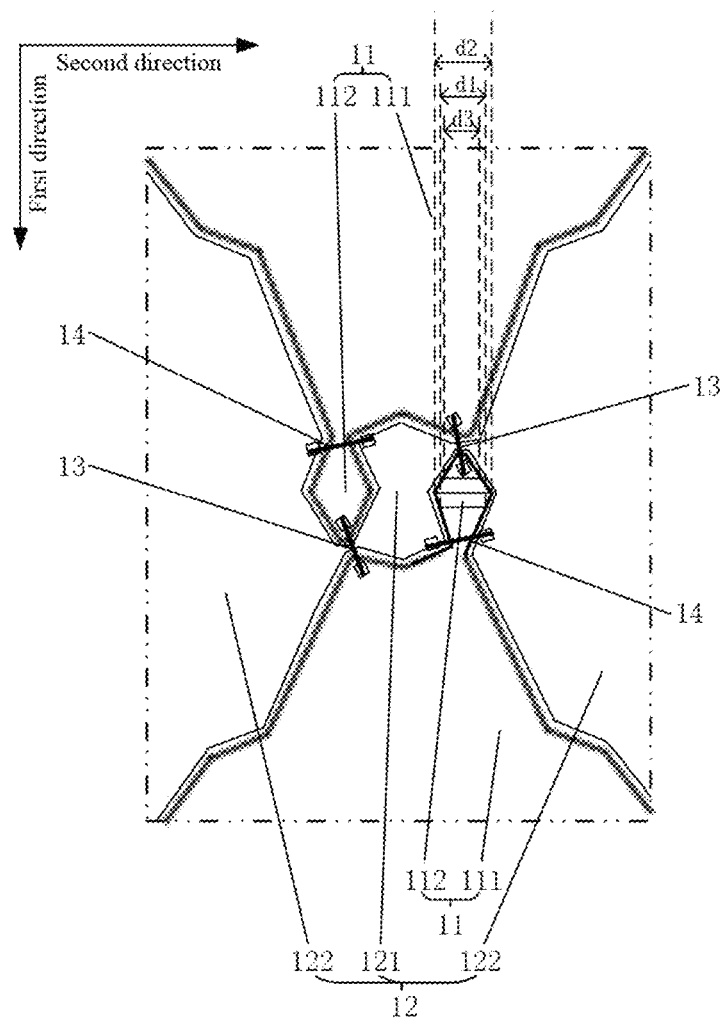
FIG. 1 is a schematic structural diagram of a repeat unit of a touch functional component in an embodiment of present application.

Features and exemplary embodiments of various aspects of the present application will be described in detail below. In order to make the objectives, technical solutions, and advantages of the present application clearer, the present application will be further described in detail below with reference to the accompanying drawings and specific embodiments. It should be understood that the specific embodiments described here are only intended to explain the present application, but not to limit the present application. For those skilled in the art, the present application can be implemented without some of these specific details. The following descriptions of the embodiments are merely to provide a better understanding of the present application by showing examples of the present application.

With the continuous development of display technology, display apparatuses play an increasingly important role in people's work, life, and learning. Display panels with touch functions have been greatly popularized due to their good interactivity. The display panels have touch functional components for implementing the touch functions. The touch functional component includes a sensing electrode and a driving electrode, and the impedance of the sensing electrode greatly differs from that of the driving electrode. As a result, the transmission speed of an electrical signal transmission channel of the electrode with higher impedance is slower, which reduces the response speed to operations of the display panel with the touch function.

The present application provides a touch functional component, a display panel, and a display apparatus, which can reduce an impedance difference between two kinds of electrodes in the touch functional component, so that the impedances of the electrodes in the touch functional component are consistent or tend to be consistent, the transmission speeds of electrical signal transmission channels of the two kinds of electrodes are both fast, and the response speed to operations of the display panel with the touch function can be improved.

The present application provides a touch functional component. The touch functional component may include first electrodes, second electrodes, first connection bridges, and second connection bridges. For ease of understanding, the touch functional component will be explained below in conjunction with local repeat units in the touch functional component. The touch functional component may include repeat units arranged in an array. As shown in FIGS. 1, 2, 3, and 4, the touch functional component may include first electrodes 11, second electrodes 12, first connection bridges 13, and second connection bridges 14.

A plurality of first electrodes 11 are successively distributed in a first direction. In two adjacent first electrodes 11, at least one first electrode 11 includes an electrode body 111 and an electrode protrusion 112. In some examples, in two adjacent first electrodes 11, each first electrode 11 includes an electrode body 111 and an electrode protrusion 112. In a repeat unit shown in FIGS. 1, 2, and 3, each first electrode 11 may include one electrode body 111 and one electrode protrusion 112. In some other examples, in two adjacent first electrodes 11, one first electrode 11 includes an electrode body 111 and an electrode protrusion 112, and the other first electrode 11 includes an electrode body 111 but does not include an electrode protrusion 112. In a repeat unit shown in FIG. 4, one first electrode 11 includes one electrode body 111 and two electrode protrusions 112, and the other electrode 11 includes one electrode body 111 but does not include any electrode protrusion 112.

In some examples, the electrode body 111 and the electrode protrusion 112 in the first electrode 11 may be of an integrated structure, namely, integrally formed, and in a same first electrode 11, the electrode body 111 extends in the first direction to form the electrode protrusion 112. As shown in FIGS. 1, 2, 3, and 4, in a case that the first electrode 11 includes an electrode body 111 and an electrode protrusion 112, the electrode body 111 and the electrode protrusion 112 in the first electrode 11 are of an integrated structure. In some examples, the electrode body 111 and the electrode protrusion 112 in the first electrode 11 may be of separate structures, and in a same first electrode 11, the electrode body 111 extends towards the electrode protrusion 112 and is in contact connection with the electrode protrusion 112.

Two adjacent first electrodes 11 include two or more electrode protrusions 112, and an accommodating area may be formed between two adjacent electrode protrusions 112. In some examples, the first electrode 11 may be an indium tin oxide electrode, namely, an ITO electrode.

Figure 2:
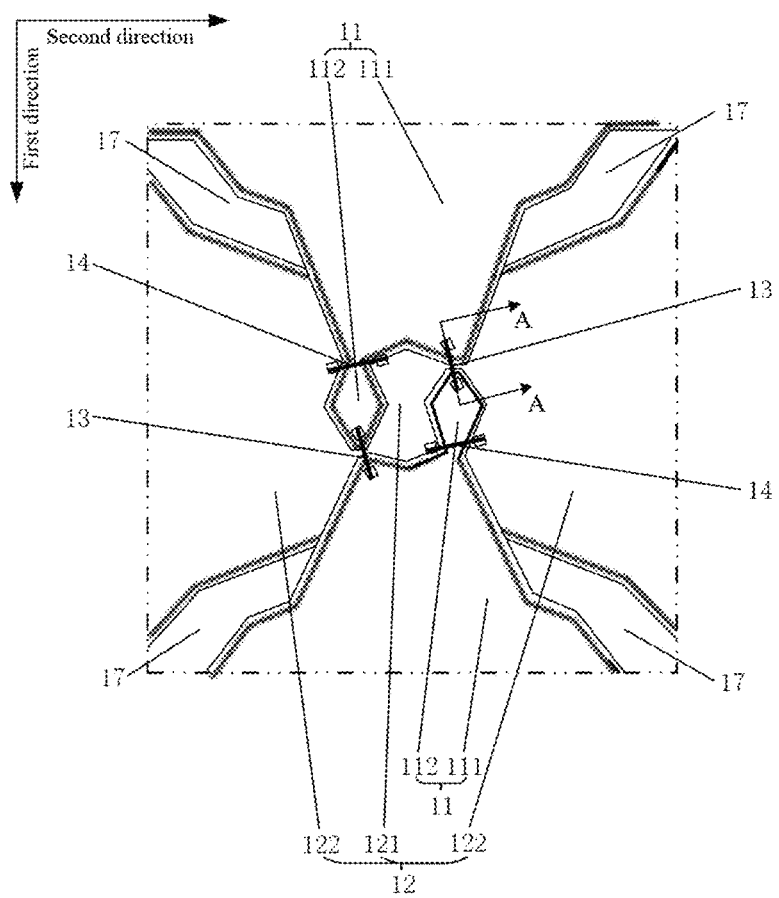
FIG. 2 is a schematic structural diagram of a repeat unit of a touch functional component in another embodiment of present application.
Figure 4:
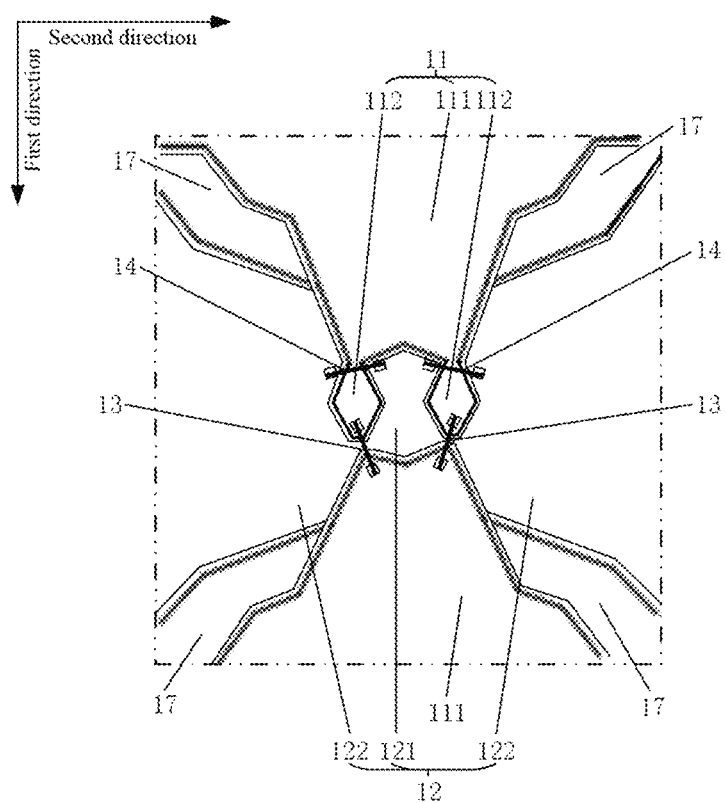
FIG. 4 is a schematic structural diagram of a repeat unit of a touch functional component in another embodiment of present application.

The second electrode 12 extends in a second direction. The second electrode 12 includes a first electrode structure 121 located in the accommodating area and second electrode structures 122 located on two sides of the accommodating area. In some examples, the first electrode structure 121 and the second electrode structures 122 may be of an integrated structure, namely, integrally formed, and the second electrode structures 122 bypass the electrode protrusions 112 and extend towards the accommodating area to form the first electrode structure 121. As shown in FIGS. 1, 2, and 4, the second electrode structure 122 may extend towards the accommodating area to form the first electrode structure 121 through a gap between the electrode protrusion 112 of one first electrode 11 and the electrode body 111 of the other first electrode 11. In some examples, the first electrode structure 121 and the second electrode structure 122 may be of separate structures, and the second electrode structure 122 may bypass the electrode protrusion 112 to extend towards the first electrode structure 121 and is in contact connection with the first electrode structure 121.

In some examples, the second electrode may be an ITO electrode.

There is an angle between the first direction and the second direction. In some examples, the first direction is perpendicular to the second direction. For example, the first direction may be a row arrangement direction of the repeat units, that is, the first direction may be a length direction of a display panel including the touch functional component, and the second direction may be a column arrangement direction of the repeat units, that is, the second direction may be a width direction of the display panel including the touch functional component. For another example, the first direction may be a column arrangement direction of the repeat units, that is, the first direction may be a width direction of a display panel including the touch functional component, and the second direction may be a row arrangement direction of the repeat units, that is, the second direction may be a length direction of the display panel including the touch functional component.

The first connection bridge 13 electrically connects the electrode protrusion 112 of one first electrode 11 in two adjacent first electrodes 11 with the electrode body 111 of the other first electrode 11. The first connection bridge is made of a conductor material, for example, the first connection bridge may be of a metal bridge structure or other conductor material structure, which is not limited here. The first connection bridge has an electrical conduction function, and can achieve electrical connection between the electrode protrusion 112 of the one first electrode 11 and the electrode body 111 of the other first electrode 11. In some examples, at least a portion of an orthographic projection of the first connection bridge 13 may fall within a first gap. The first gap is a gap between the electrode protrusion 112 of one first electrode 11 in two adjacent first electrodes 11 and the electrode body 111 of the other first electrode 11. In the present application, the first electrode 11 and the second electrode 12 may be insulated, that is, the first electrode 11 and the second electrode 12 are not in actual contact, so as to avoid contact conduction between the first electrode 11 and the second electrode 12 and thus failure of the touch function. For example, an insulating gap may be disposed between the first electrode 11 and the second electrode 12. An insulating structure may be disposed in the insulating gap, but it is not limited here. Meanwhile, in the present embodiment, the electrode protrusion 112 of one first electrode 11 in two adjacent first electrodes 11 and the electrode body 111 of the other first electrode 11 are also not in contact connection, with a distance formed between them, that is, the first gap in the present application is formed between them. The first gap may include the insulating gap between the first electrode 11 and the second electrode 12. The first gap may overlap with the second electrode 12, and at least a portion of an orthographic projection of the first connection bridge 13 falls within the first gap, that is, at least a portion of an orthographic projection of the first connection bridge 13 falls within the second electrode 12.

The second connection bridge 14 electrically connects the first electrode structure 121 with the second electrode structure 122. An orthographic projection of the second connection bridge 14 overlaps at least partially with that of the electrode protrusion 112. The orthographic projection here refers to a projection in a thickness direction. The second connection bridge 14 is made of a conductor material, for example, the second connection bridge 14 may be of a metal bridge structure or other conductor material structure, which is not limited here. The second connection bridge 14 has an electrical conduction function and can achieve electrical connection between the first electrode structure 121 and the second electrode structure 122. In some examples, the orthographic projection of the second connection bridge 14 overlaps at least partially with that of an end of the electrode protrusion 112 of one of the first electrodes 11 extending towards the electrode body 111 of the other first electrode 11.

A cross-sectional width of the electrode protrusion 112 is less than that of the electrode body 111. In some examples, the cross-sectional width of the electrode protrusion 112 increases first and then decreases in the first direction. As shown in FIG. 1, in the first direction, the cross-sectional width d3 of the electrode protrusion 112 is less than the cross-sectional width d2, and the cross-sectional width d2 is greater than the cross-sectional width d1, that is, the cross-sectional width of the electrode protrusion 112 increases from a position corresponding to the cross-sectional width d3 to a position corresponding to the cross-sectional width d2, and decreases from the position corresponding to the cross-sectional width d2 to a position corresponding to the cross-sectional width d1.

In a same first electrode 11, the cross-sectional width of an end of the electrode protrusion 112 extending towards the electrode body 111, is less than that of an end of the electrode protrusion 112 away from the electrode body 111, that is, the end of the electrode protrusion 112 extending towards the electrode body 111 is a portion having a minimum cross-sectional width in the electrode protrusion 112, or the cross-section of the end of the electrode protrusion 112 extending towards the electrode body 111 may be a minimum cross-section of the electrode protrusion 112, namely, a minimum current passing cross-section. The minimum current passing cross-section is a minimum cross-section through which current passes. The orthographic projection of the second connection bridge 14 may overlap at least partially with that of the end of the electrode protrusion 112 with the minimum cross-section, so that the length of the second connection bridge 14 can be reduced, thereby reducing the impact of the second connection bridge 14 on the visibility of the display panel including the touch functional component, and improving the visibility of the display panel including the touch functional component.

In some examples, the number of first connection bridges 13 may be the same as the number of electrode protrusions 112, and the number of second connection bridges may be the same as the number of electrode protrusions 112, but the numbers are not limited thereto.

Figure 5:
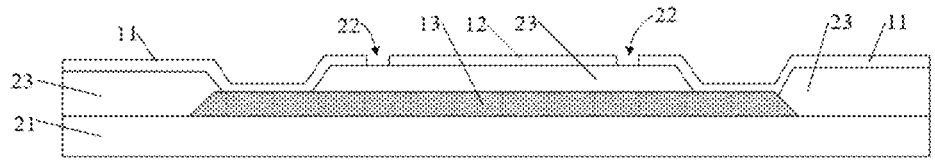
FIG. 5 is a cross-sectional view of an example taken along line A-A in FIG. 2.

The first electrode 11 and the second electrode 12 are insulated from each other, and the specific insulation manner is not limited here. FIG. 5 is a cross-sectional view of an example taken along line A-A in FIG. 2. As shown in FIG. 5, the first connection bridge 13 may be located between a base layer 21 and the first electrode 11. A portion of the first electrode 11 is electrically connected to the first connection bridge 13. The base layer 21 may include a base plate and may further include other layer structures, which are not limited here. The second electrode 12 and the first electrode 11 may be disposed on the same layer, and an insulating gap 22 is provided between the first electrode 11 and the second electrode 12. An insulating layer 23 is disposed between the second electrode 12 and the first connection bridge 13. The insulating layer 23 may be a silicon oxide layer or other material layer, and is not limited here.

Figure 6:
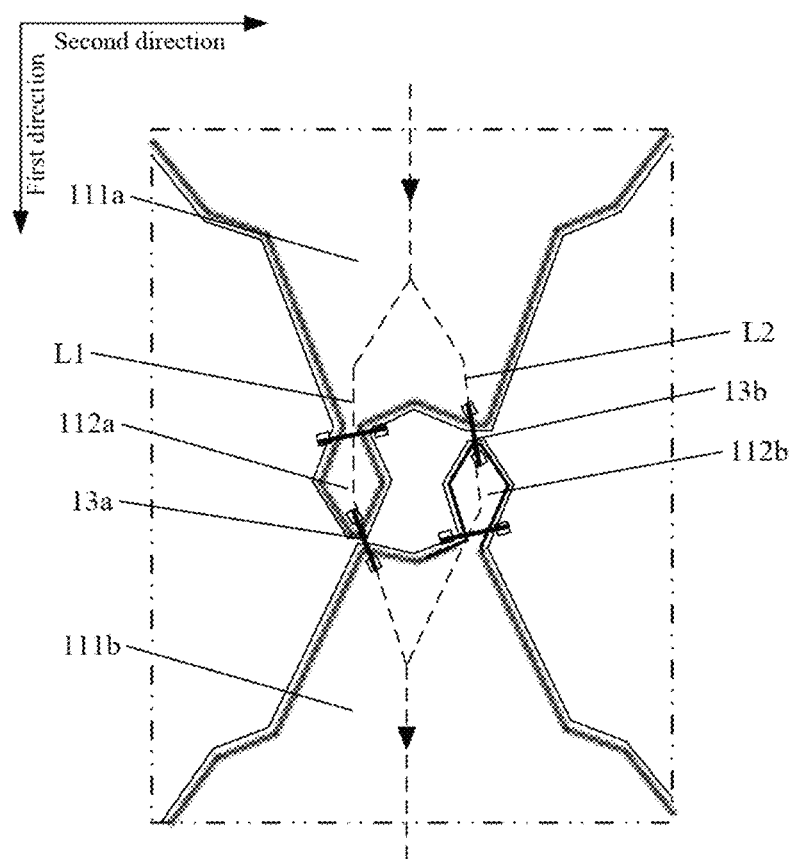
FIG. 6 is a schematic diagram of an example of an electrical signal transmission channel of first electrodes in FIG. 1.
Figure 7:
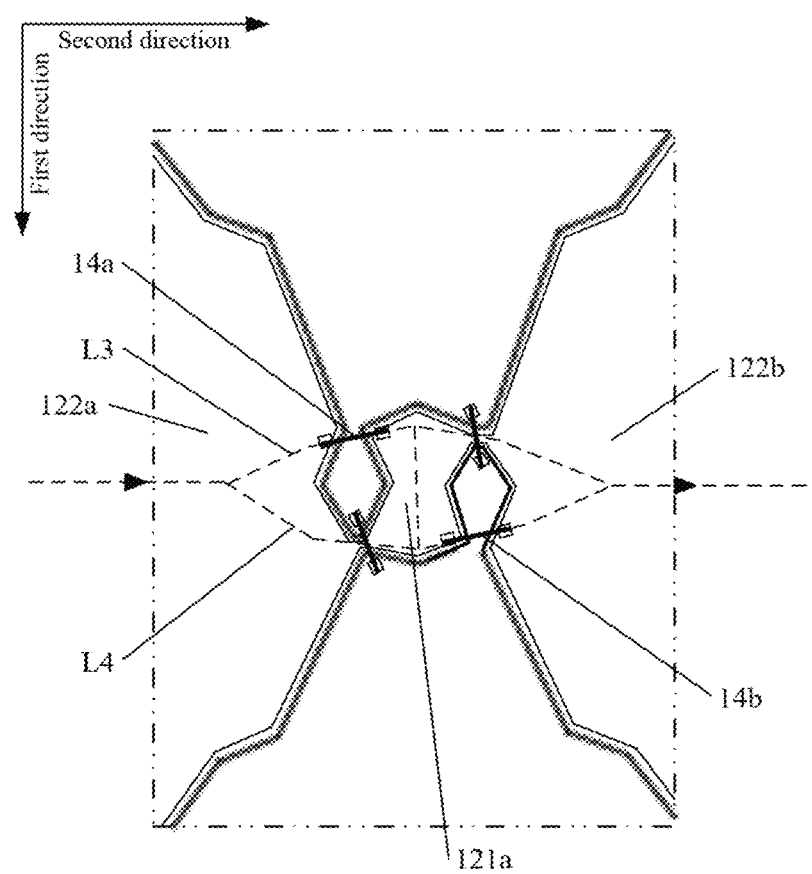
FIG. 7 is a schematic diagram of an example of an electrical signal transmission channel of a second electrode in FIG. 1.

In the above embodiments, there are two or more parallel branches between two adjacent first electrodes 11, and each of the branches includes the electrode protrusion 112 and the first connection bridge 13. There are also two or more parallel branches among the second electrode structure 122, the first electrode structure 121, and the second electrode structure 122 successively distributed in the second electrode 12, and each of the branches includes the second connection bridge 14 and the second electrode 12 located in the gap between the electrode protrusion 112 and the electrode body 111. For ease of explanation, refer to FIG. 6 and FIG. 7, where FIG. 6 shows an electrical signal transmission channel of the first electrodes in FIG. 1, and FIG. 7 shows an electrical signal transmission channel of the second electrode in FIG. 1. The electrical signal transmission channel of the first electrodes 11 in FIG. 6 includes two parallel branches, which are L1 and L2 respectively. Assuming a current direction to be the first direction, current in the branch L1 flows through the electrode body 111a, the electrode protrusion 112a, the first connection bridge 13a, and the electrode body 111b, and current in the branch L2 flows through the electrode body 111a, the first connection bridge 13b, the electrode protrusion 112b, and the electrode body 111b. The electrical signal transmission channel of the second electrode in FIG. 7 includes two parallel branches, which are L3 and L4 respectively. Assuming a current direction to be the second direction, current in the branch L3 flows through the second electrode structure 122a, the second connection bridge 14a, the first electrode structure 121a, and the second electrode structure 122b, and current in the branch L4 flows through the second electrode structure 122a, the first electrode structure 121a, the second connection bridge 14b, and the second electrode structure 122b, where he first electrode structure 121a in the branch L3 and the first electrode structure 121a in the branch L4 may be considered as in series connection.

As can be seen from FIGS. 6 and 7, the electrical signal transmission channel of the first electrodes 11 includes two parallel branches, and the electrical signal transmission channel of the second electrode 12 also includes two parallel branches, namely, the impedance of the first electrode 11 and the impedance of the second electrode 12 are both low. Although the two parallel branches in the electrical signal transmission channel of the second electrode 12 further have a series connection relationship, the series connection relationship has a small impact on the impedance. The impedance of the first electrode 11 is slightly greater than that of the second electrode 12, but the difference between the impedance of the first electrode 11 and the impedance of the second electrode 12 is within an acceptable impedance error range. The impedance of the first electrode 11 and the impedance of the second electrode 12 tend to be consistent and are both low, and thus it can be ensured that the transmission speed of the electrical signal transmission channel of the first electrodes 11 and the electrical signal transmission speed of the second electrode 12 tend to be consistent and are faster.

In the above embodiments, the first electrode 11 is one of a sensing electrode and a driving electrode, and the second electrode 12 is the other of the sensing electrode and the driving electrode. For example, the first electrode 11 is the sensing electrode, and the second electrode 12 is the driving electrode. For another example, the first electrode 11 is the driving electrode, and the second electrode 12 is the sensing electrode.

In the embodiments of the present application, the touch functional component includes first electrodes 11, second electrodes 12, first connection bridges 13, and second connection bridges 14. In two adjacent first electrodes 11, at least one first electrode 11 includes an electrode body 111 and an electrode protrusion 112. In a same first electrode 11, the electrode body 111 extends in the first direction to form the electrode protrusion 12, or the electrode body 111 extends towards and is in contact connection with the electrode protrusion 112. Two adjacent first electrodes 11 include two or more electrode protrusions 112. The second electrode 12 includes a first electrode structure 121 located between two adjacent electrode protrusions 112 and second electrode structures 122 located on two sides of the first electrode structure 121. The second electrode structures 122 bypass the electrode protrusions 112 and extend towards the accommodating area to form the first electrode structure 121, or the second electrode structures 122 bypass the electrode protrusions 112 and extend towards and are in contact connection with the first electrode structure 121. The first connection bridge 13 electrically connects the electrode protrusion 112 of one first electrode 11 with the electrode body 111 of the other adjacent first electrode 11. The second connection bridge 14 electrically connects the first electrode structure 121 with the second electrode structure 122. In two adjacent first electrodes 11, the electrode bodies 111, the electrode protrusions 112, and the first connection bridges 13 may form two or more parallel branches. In the second electrode 12, the first electrode structure 121 and the second electrode structures 122 may form two or more parallel branches. The structure of the electrical signal transmission channel of the first electrodes 11 is substantially consistent with that of the electrical signal transmission channel of the second electrode 12, and the parallel connection of the branches in the electrical signal transmission channels reduces the impedance of the first electrode 11 and the impedance of the second electrode 12, which can ensure that the transmission speed of the electrical signal transmission channel of the first electrodes 11 and the electrical signal transmission speed of the second electrode 12 are faster, thereby improving the response speed to operations of the display panel including the touch functional component.

In the above embodiments, the first connection bridges 13 and the second connection bridges 14 may be disposed around the first electrode structure 121.

Figure 3:
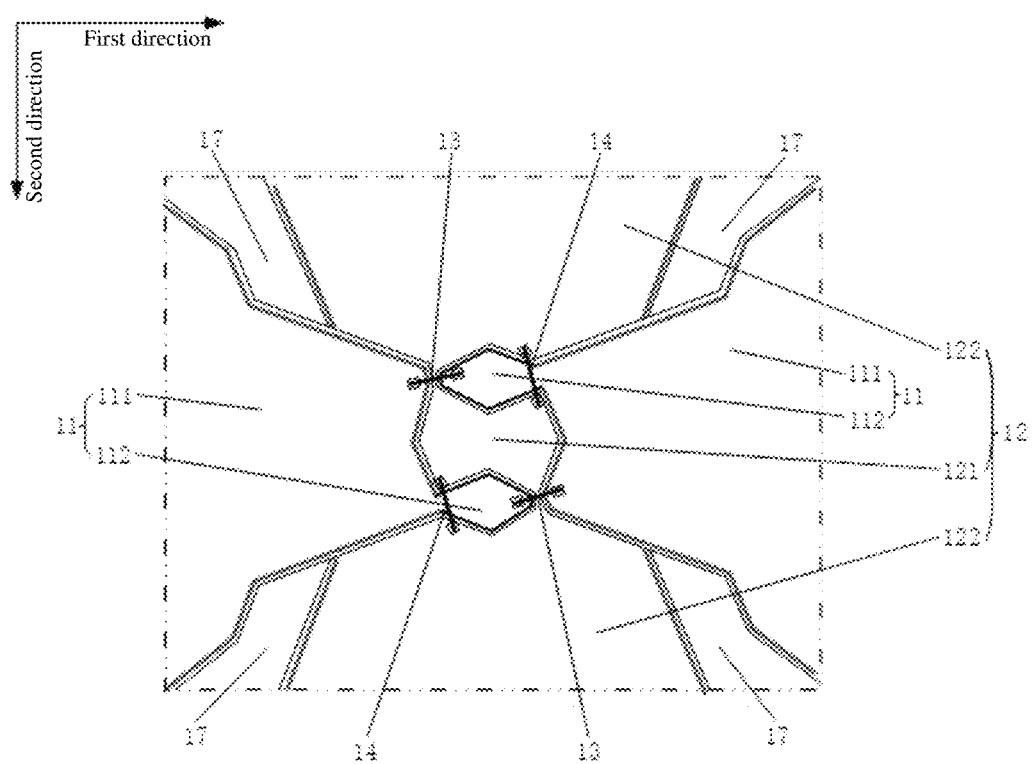
FIG. 3 is a schematic structural diagram of a repeat unit of a touch functional component in another embodiment of present application.

In some embodiments, each first electrode 11 includes at least one electrode protrusion 112 on a side close to the adjacent first electrode 11, and the electrode protrusions 112 of two adjacent first electrodes 11 are opposite in the second direction. For example, as shown in FIGS. 1, 2, and 3, each first electrode 11 includes one electrode protrusion 112 on the side close to the adjacent first electrode 11, and two adjacent first electrodes 11 include two electrode protrusions 112. The first electrode structure 121 is located in the accommodating area formed between the two electrode protrusions 112, and the first connection bridges 13 and the second connection bridges 14 are alternately disposed around the first electrode structure 121. As shown in FIG. 1, starting from a second connection bridge 14, a second connection bridge 14, a first connection bridge 13, a second connection bridge 14, and a first connection bridge 13 are sequentially distributed around the first electrode structure 121 in a clockwise direction; and starting from a second connection bridge 14, a second connection bridge 14, a first connection bridge 13, a second connection bridge 14, and a first connection bridge 13 are sequentially distributed around the first electrode structure 121 in an anticlockwise direction.

In some other embodiments, in two adjacent first electrodes 11, one first electrode 11 includes at least two electrode protrusions 112 on a side close to the other first electrode 11, and the two or more electrode protrusions 112 of the same first electrode 11 are opposite in the second direction.

In some examples, in two adjacent first electrodes 11, one first electrode 11 includes at least two electrode protrusions 112 on a side close to the other first electrode 11, and the other first electrode 11 does not include any electrode protrusion 112 on a side close to the adjacent first electrode 11. As shown in FIG. 4, the upper first electrode 11 includes two electrode protrusions 112 on a side close to the lower first electrode 11, and the lower first electrode 11 does not include any electrode protrusion on a side close to the upper first electrode 11.

In some other examples, in two adjacent first electrodes 11, one electrode 11 includes at least two electrode protrusions 112 on a side close to the other first electrode 11, and the other first electrode 11 includes at least one electrode protrusion 112 on a side close to the adjacent first electrode 11. The number of electrode protrusions 112 of one first electrode 11 on the side close to the other first electrode 11 is greater than that of electrode protrusions 112 of the other first electrode 11 on the side close to the adjacent first electrode 11. Some electrode protrusions 112 of the respective two adjacent first electrodes 11 may be opposite in the first direction, and two electrode protrusions 112 opposite in the first direction can be electrically connected by a connection bridge, so that the electrode protrusions 112, opposite in the first direction, of the two adjacent first electrodes 11 are conducted to form branches in the electrical signal transmission channel of the first electrodes 11. At least one electrode protrusion 112 of one first electrode 11 on the side close to the other first electrode 11 is not opposite to another electrode protrusion 112 in the first direction, and may be connected to the electrode body 111 of the other first electrode 11 by the first connection bridge 13, so that the electrode protrusion 112 of one first electrode 11 in two adjacent first electrodes 11 may be conducted to the electrode body 111 of the other first electrode 11, forming a branch in the electrical signal transmission channel of the first electrodes 11.

An accommodating area may be formed between two adjacent electrode protrusions 112 opposite in the second direction. The first electrode structure 121 is located in the accommodating area, and around the first electrode structure 121, a plurality of first connection bridges are sequentially disposed, and a plurality of second connection bridges are sequentially disposed. As shown in FIG. 4, starting from a second connection bridge 14, a second connection bridge 14, a second connection bridge 14, a first connection bridge 13, and a first connection bridge 13 are sequentially distributed around the first electrode structure 121 in a clockwise direction: and starting from a first connection bridge 13, a first connection bridge 13, a first connection bridge 13, a second connection bridge 14, and a second connection bridge 14 are sequentially distributed around the first electrode structure 121 in an anticlockwise direction.

Figure 8:
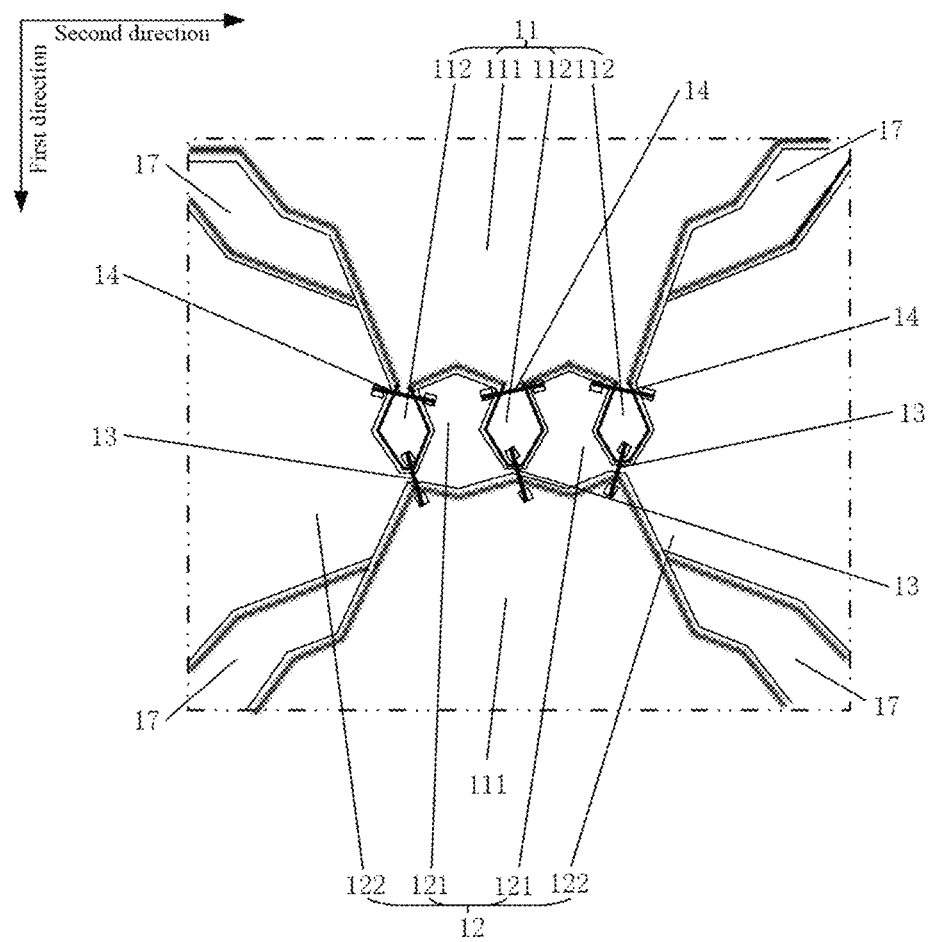
FIG. 8 is a schematic structural diagram of a repeat unit of a touch functional component in a further embodiment of present application.

In some embodiments, in a case that the first electrode 11 includes an electrode protrusion(s) 112, the number of electrode protrusions 112 of the first electrode 11 is not limited here. For example, as shown in FIGS. 1, 2, and 3, one first electrode 11 in a repeat unit may include one electrode protrusion 112. For another example, as shown in FIG. 4, one first electrode 11 in a repeat unit may include two electrode protrusions 112. For another example, as shown in FIG. 8, which is a schematic structural diagram of a repeat unit of a touch functional component in another embodiment of the present application, one first electrode 11 in the repeat unit may include three electrode protrusions 112, and two accommodating spaces are formed among the three electrode protrusions 112, that is, two first electrode structures 121 are disposed among the three electrode protrusions 112. As shown in FIG. 8, three first connection bridges 13 are sequentially disposed in the second direction, and three second connection bridges 14 are sequentially disposed in the second direction: around each first electrode structure 121, two first connection bridges 13 are sequentially disposed, and two second connection bridges 14 are sequentially disposed: for example, starting from the upper left second connection bridge 14, a second connection bridge 14, a second connection bridge 14, a first connection bridge 13, and a first connection bridge 13 are sequentially distributed around the left first electrode structure 121 in a clockwise direction: for another example, starting from the upper middle second connection bridge 14, a second connection bridge 14, a second connection bridge 14, a first connection bridge 13, and a first connection bridge 13 are sequentially distributed around the right first electrode structure 121 in a clockwise direction.

In some application scenarios, the touch functional component needs to be applied to a display panel with a length-width ratio of 1:1. Correspondingly, in order to further improve the response speed to operations of the display panel with a touch function, the difference between the impedance of the first electrode 11 and the impedance of the second electrode 12 can be further reduced or the impedance of the first electrode 11 can be made the same as that of the second electrode 12.

Figure 9:
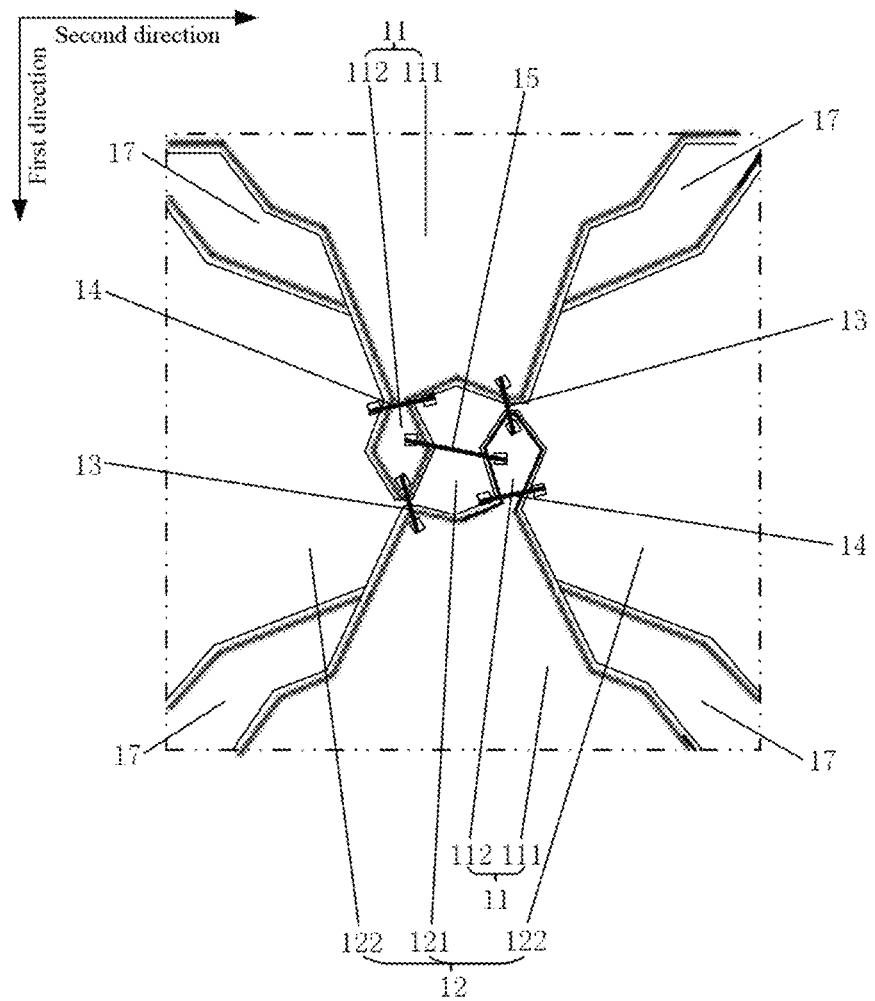
FIG. 9 is a schematic structural diagram of a repeat unit of a touch functional component in another further embodiment of present application.

In some examples, the touch functional component may further include third connection bridges. FIG. 9 is a schematic structural diagram of a repeat unit of a touch functional component in another embodiment of the present application. As shown in FIG. 9, the third connection bridge 15 may electrically connect two adjacent electrode protrusions 112, so that the two adjacent electrode protrusions 112 are connected in series.

Figure 10:
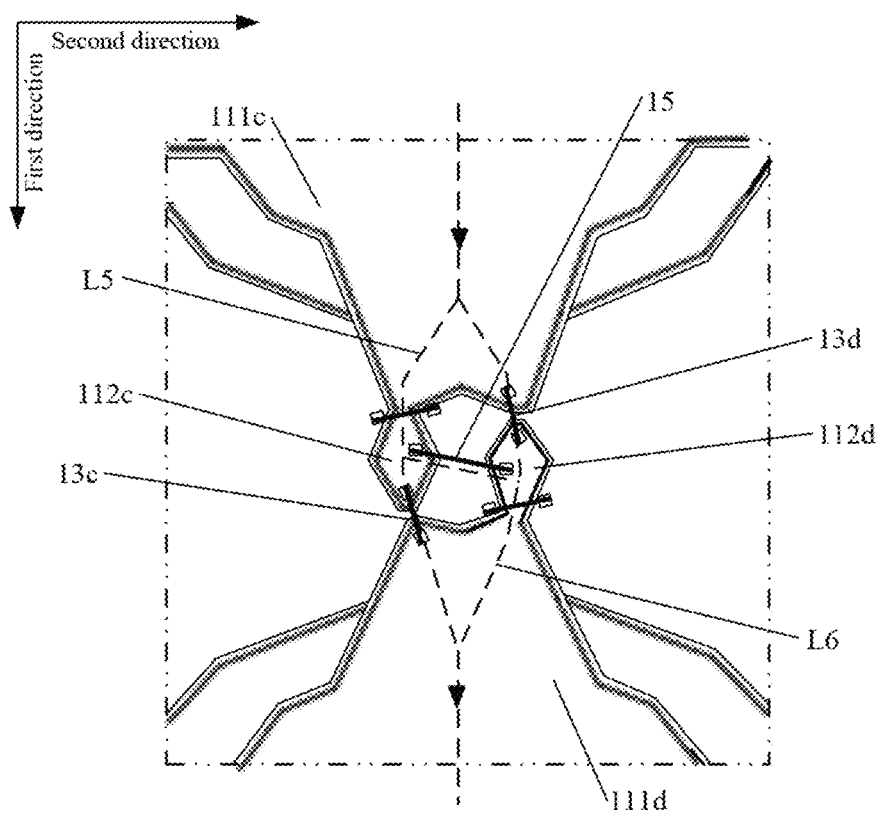
FIG. 10 is a schematic diagram of an example of an electrical signal transmission channel of first electrodes in FIG. 9.
Figure 11:
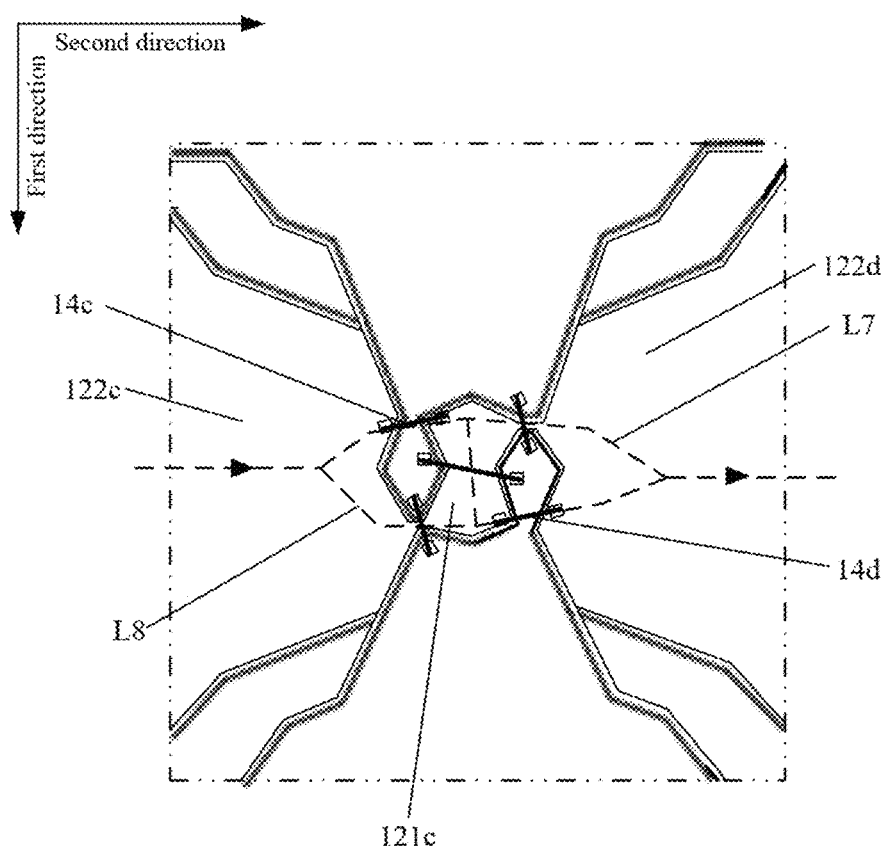
FIG. 11 is a schematic diagram of an example of an electrical signal transmission channel of a second electrode in FIG. 9.

FIG. 10 shows an electrical signal transmission channel of first electrodes in FIG. 9, and FIG. 11 shows an electrical signal transmission channel of a second electrode in FIG. 9. The electrical signal transmission channel of the first electrodes in FIG. 10 includes two parallel branches, which are L5 and L6 respectively. Assuming a current direction to be the first direction, current in the branch L5 flows through the electrode body 111c, the electrode protrusion 112c, the first connection bridge 13c, and the electrode body 111d, and current in the branch L6 flows through the electrode body 111c, the first connection bridge 13d, the electrode protrusion 112d, and the electrode body 111d, where the third connection bridge 15 connects the electrode protrusion 112c in the branch L5 with the electrode protrusion 112d in the branch L6 in series.

The electrical signal transmission channel of the second electrode in FIG. 11 includes two parallel branches, which are L7 and L8 respectively. Assuming a current direction to be the second direction, current in the branch L7 flows through the second electrode structure 122c, the second connection bridge 14c, the first electrode structure 121c, and the second electrode structure 122d, and current in the branch L8 flows through the second electrode structure 122c, the first electrode structure 121c, the second connection bridge 14d, and the second electrode structure 122d, where the first electrode structure 121c in the branch L7 and the first electrode structure 121c in the branch L8 may be considered in series connection.

As can be seen from FIG. 10 and FIG. 11, in a case that the touch functional component includes the third connection bridge 15, the parallel branches in the electrical signal transmission channel of the first electrodes 11 also have a series connection relationship, so that the structure of the electrical signal transmission channel of the first electrodes 11 is consistent with that of the electrical signal transmission channel of the second electrode 12, which can further reduce the difference between the impedance of the first electrode 11 and the impedance of the second electrode 12, or make the impedance of the first electrode 11 the same as that of the second electrode 12.

Figure 12:
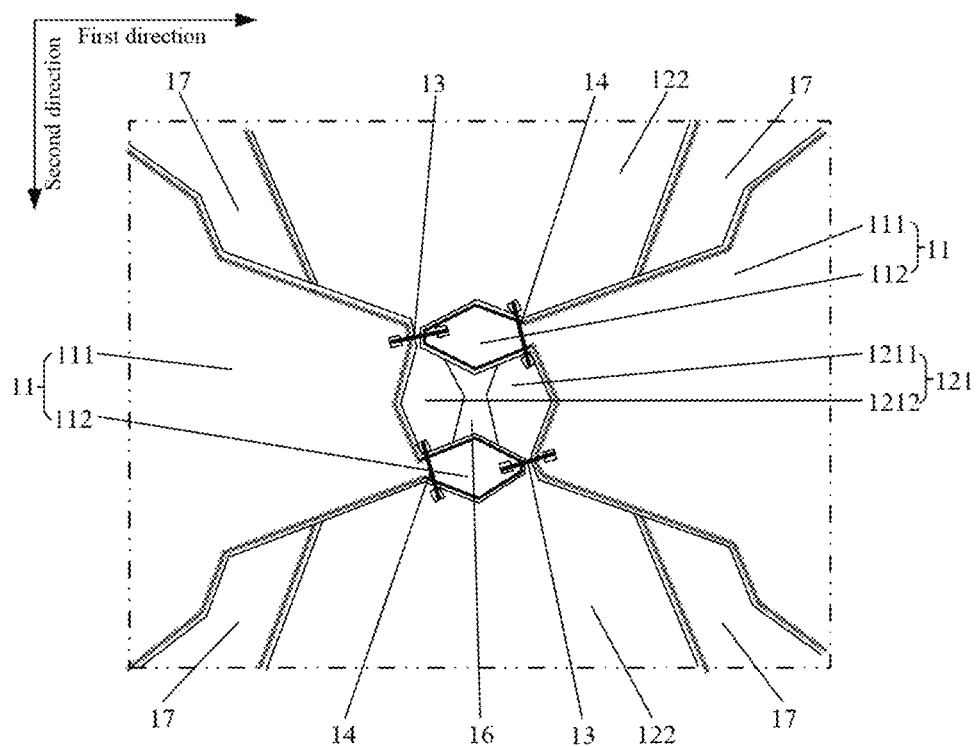
FIG. 12 is a schematic structural diagram of a repeat unit of a touch functional component in another embodiment of present application.

In some examples, the first electrode structure 121 may include two separate sub electrode structures. FIG. 12 is a schematic structural diagram of a repeat unit of a touch functional component in another embodiment of the present application. As shown in FIG. 12, the first electrode structure 121 may include a first sub electrode structure 1211 and a second sub electrode structure 1212, and a first blank area 16 is formed among the first sub electrode structure 1211, the second sub electrode structure 1212, and the electrode protrusions 112. The first blank area 16 separates and insulates the first sub electrode structure 1211 from the second sub electrode structure 1212. The second electrode structure 122 on one side of the first electrode structure 121 may bypass the electrode protrusion 112 and extend towards the accommodating area to form the first sub electrode structure 1211, or the first sub electrode structure 1211 may extend towards and be in contact connection with the second electrode structure 122 on one side of the first electrode structure 121. The second electrode structure 122 on the other side of the first electrode structure 121 may bypass the electrode protrusion 112 and extend towards the accommodating area to form the second sub electrode structure 1212, or the second sub electrode structure 1212 may extend towards and be in contact connection with the second electrode structure 122 on the other side of the first electrode structure 121.

Figure 13:
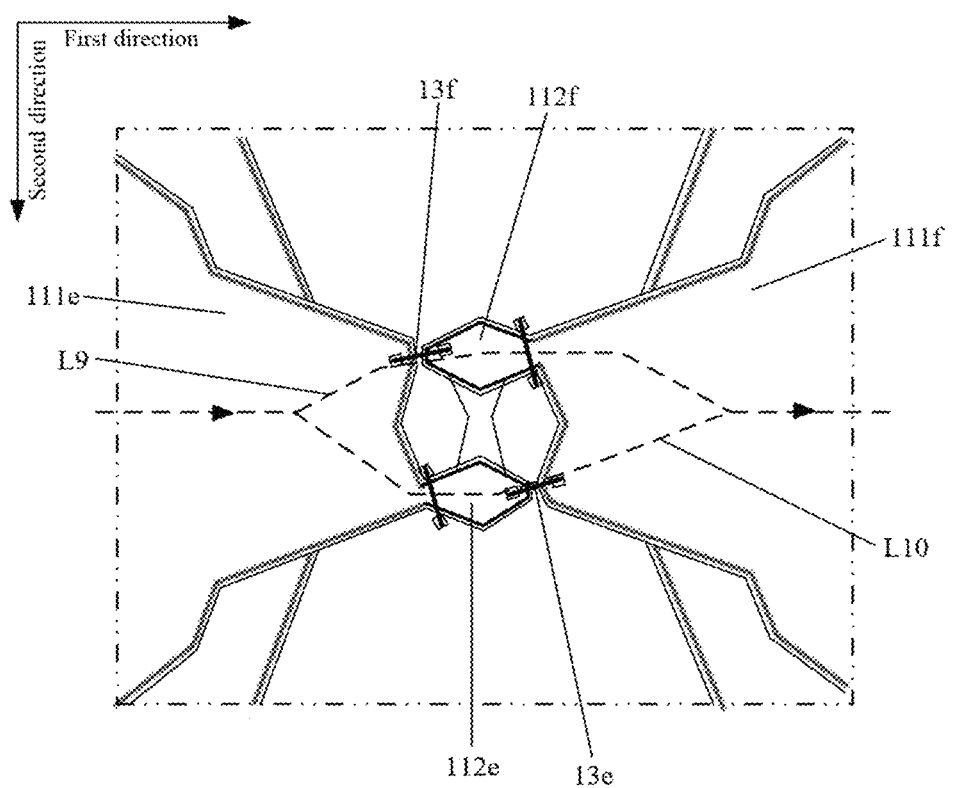
FIG. 13 is a schematic diagram of an example of an electrical signal transmission channel of first electrodes in FIG. 12.
Figure 14:
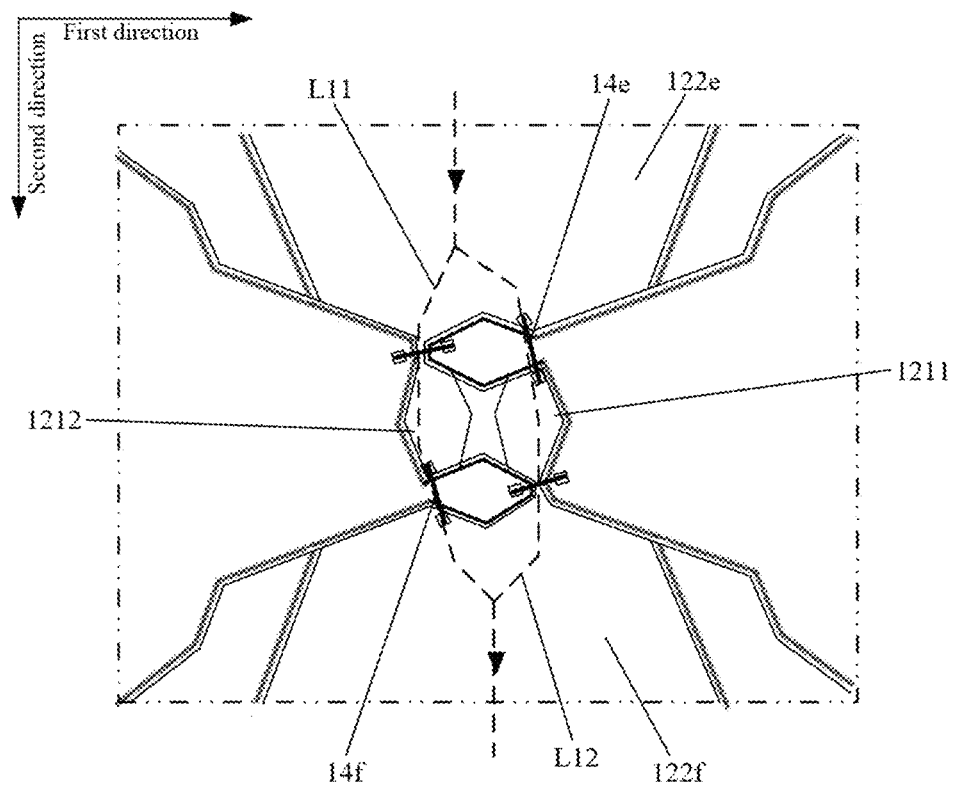
FIG. 14 is a schematic diagram of an example of an electrical signal transmission channel of a second electrode in FIG. 12.

FIG. 13 shows an electrical signal transmission channel of first electrodes in FIG. 12, and FIG. 14 shows an electrical signal transmission channel of a second electrode in FIG. 12. The electrical signal transmission channel of the first electrodes in FIG. 13 includes two parallel branches, which are L9 and L10 respectively. Assuming a current direction to be the first direction, current in the branch L9 flows through the electrode body 111e, the first connection bridge 13f, the electrode protrusion 112f, and the electrode body 111f, and current in the branch L10 flows through the electrode body 111e, the electrode protrusion 112e, the first connection bridge 13e, and the electrode body 111f.

The electrical signal transmission channel of the second electrode in FIG. 14 includes two parallel branches, which are L11 and L12 respectively. Assuming the current direction to be the second direction, current in the branch L11 flows through the second electrode structure 122e, the second sub electrode structure 1212, the second connection bridge 14f, and the second electrode structure 122f, and current in the branch L12 flows through the second electrode structure 122e, the second connection bridge 14e, the first sub electrode structure 1211, and the second electrode structure 122f, where the first sub electrode structure 1211 and the second sub electrode structure 1212 are insulated from each other.

As can be seen from FIG. 13 and FIG. 14, in a case that the first electrode structure 121 includes a first sub electrode structure 1211 and a second sub electrode structure 1212, the parallel branches in the electrical signal transmission channel of the second electrode 12 do not have a series connection relationship, so that the structure of the electrical signal transmission channel of the first electrodes 11 is consistent with that of the second electrode 12, which further reduces the difference between the impedance of the first electrode 11 and the impedance of the second electrode 12, or makes the impedance of the first electrode 11 the same as that of the second electrode 12.

In some embodiments, a blank area may be disposed between the first electrode 11 and the second electrode 12 to reduce the areas of the first electrode 11 and the second electrode 12 and save electrode materials for fabricating the touch functional component. Other virtual electrodes may be disposed in the blank area as desired, and details will not be repeated here. As shown in FIGS. 2, 3, 4, 8, 9, and 12, a second blank area 17 is formed between the electrode body 111 and the second electrode structure 122. Neither the first electrode 11 nor the second electrode 12 is disposed in the second blank area 17. The second blank area 17 may be a hollowed area or other structures may be disposed therein, which is not limited here.

Figure 15:
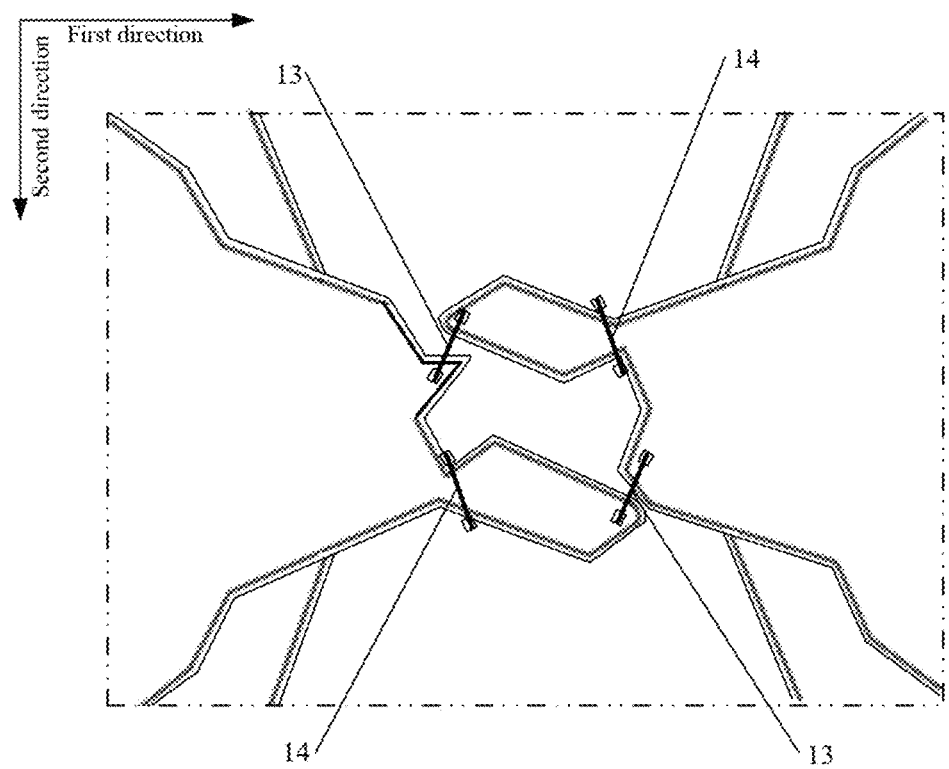
FIG. 15 is a schematic diagram of an example of extension directions of first connection bridges and second connection bridges provided in an embodiment of the present application.

In some embodiments, in order to improve the visibility of the display panel including the touch functional component, orthographic projections of a plurality of first connection bridges 13 overlap at least partially with narrowest positions of the first gaps, and orthographic projections of a plurality of second connection bridges 14 overlap at least partially with those of the ends of the electrode protrusions 112 with minimum cross-sectional widths: with such configuration, extension directions of the plurality of first connection bridges 13 may be consistent, and extension directions of the plurality of second connection bridges 14 may be consistent. The connection bridges in the consistent direction are more convenient to fabricate. FIG. 15 is a schematic diagram of an example of extension directions of first connection bridges and second connection bridges provided in an embodiment of the present application. As shown in FIG. 15, the extension directions of the plurality of first connection bridges 13 are consistent, and the extension directions of the plurality of second connection bridges 14 are also consistent.

The display panel includes pixel units. In order to further improve the visibility of the display panel including the touch functional component and minimize the impact of the first connection bridges 13 and the second connection bridges 14 on the visibility of the display panel, in some examples, the extension direction of the first connection bridges 13 may be consistent with an arrangement direction of the pixel units of the display panel, and the extension direction of the second connection bridges 14 may be consistent with the arrangement direction of the pixel units of the display panel. In some examples, an angle between the extension direction of the first connection bridges 13 and the arrangement direction of the pixel units on the display panel is less than an acceptable deviation angle threshold, and an angle between the extension direction of the second connection bridges 14 and the arrangement direction of the pixel units on the display panel is less than an acceptable deviation angle threshold. In some examples, the extension direction of the first connection bridges 13 is consistent with an extension direction of an angular bisector of a first angle, and the extension direction of the second connection bridges 14 is consistent with the extension direction of the angular bisector of the first angle. In some examples, an angle between the extension direction of the first connection bridges 13 and the angular bisector of the first angle is less than an acceptable deviation angle threshold, and an angle between the extension direction of the second connection bridges 14 and the angular bisector of the first angle is less than an acceptable deviation angle threshold. The first angle in the above examples is an angle formed between a diagonal direction of the pixel units of the display panel and the arrangement direction of the pixel units on the display panel.

The present application further provides a display panel. The display panel includes the touch functional component in the above embodiments. The specific content of the touch functional component may be found in the relevant explanations of the above embodiments, and details will not be repeated here. The display panel may include display structures in apparatuses such as mobile phones, computers, tablets, televisions, and electronic paper, and is not limited here.

In the display panel of the embodiments of the present application, the driving electrodes located at edges of two ends of the touch functional component may be connected to a first signal transmission line, and the sensing electrode located at an edge of one end of the touch functional component may be connected to a second signal transmission line. For example, if the current direction of the driving electrodes is the first direction and the current direction of the sensing electrode is the second direction, the driving electrodes at two ends of the touch functional component in the first direction are connected to the first signal transmission line, and the sensing electrode at one end of the touch functional component in the second direction is connected to the second signal transmission line.

To ensure that the total impedance of the first electrodes 11 in the display panel is consistent or tends to be consistent with that of the second electrodes 12, a suitable touch functional component may be adapted according to the length-width ratio of the display panel.

In some examples, when the length-width ratio of the display panel is 1:M and M>1, that is, when the length of the display panel is less than its width, for example, the display panel has a vertical screen, the first direction may be a length direction of the display panel, and the second direction may be a width direction of the display panel, for example, the design of the touch functional component shown in FIG. 3 may be used. In the repeat unit shown in FIG. 3, the impedance of the first electrode 11 is slightly greater than that of the second electrode 12, the current direction of the first electrode 11 is the first direction, the current direction of the second electrode 12 is the second direction, and the length of the display panel is less than its width, the total impedance of the first electrodes 11 may be appropriately decreased, and the total impedance of the second electrodes 12 may be appropriately increased, so that the total impedance of the first electrodes 11 is consistent or tends to be consistent with that of the second electrodes 12.

In some examples, when the length-width ratio of the display panel is M:1 and M>1, that is, when the length of the display panel is greater than its width, for example, the display panel has a horizontal screen, the first direction may be a width direction of the display panel, and the second direction may be a length direction of the display panel, for example, the design of the touch functional component shown in FIG. 2 may be used. In the repeat unit shown in FIG. 2, the impedance of the first electrode 11 is slightly greater than that of the second electrode 12, the current direction of the first electrode 11 is the first direction, the current direction of the second electrode 12 is the second direction, and the length of the display panel is greater than its width, the total impedance of the second electrodes 12 may be appropriately increased, and the total impedance of the first electrodes 11 may be appropriately decreased, so that the total impedance of the first electrodes 11 is consistent or tends to be consistent with that of the second electrodes 12.

In some examples, when the length-width ratio of the display panel is 1:1, the first electrode structure includes a first sub electrode structure and a second sub electrode structure, and a first blank area is formed among the first sub electrode structure, the second sub electrode structure, and the electrode protrusions, for example, the design of the touch functional component in FIG. 12 may be used, the specific contents of which may be found in the relevant explanations of the above embodiments and will not be repeated here. Alternatively, when the length-width ratio of the display panel is 1:1, a third connection bridge is disposed between two adjacent electrode protrusions, and for example, the design of the touch functional component in FIG. 9 may be used, the specific contents of which may be found in the relevant explanations of the above embodiments and will not be repeated here. In the repeat unit of the touch functional component in the above two structures, the impedance of the first electrode 11 is consistent or tends to be consistent with that of the second electrode 12, and thus the total impedance of the first electrodes 11 in the display panel is also consistent or tends to be consistent with that of the second electrodes 12.

The present application further provides a display apparatus. The display apparatus may include the display panel in the above embodiments. The specific contents of the display panel may be found in the relevant explanations of the above embodiments, and details will not be repeated here. The display apparatus may specifically include apparatuses with display functions, such as mobile phones, computers, tablets, televisions, and electronic paper, and is not limited here.

It should be noted that the various embodiments in this specification are described in a progressive manner, the same or similar parts between the various embodiments may refer to each other, and each embodiment focuses on the differences from other embodiments. For the embodiments of the display panel and the display apparatus, related parts may refer to the explanations of the embodiments of the touch functional component. The present application is not limited to the specific structures described above and shown in the figures. Those skilled in the art may make various changes, modifications, and additions after understanding the inventive concept of the present application. And, for the sake of conciseness, detailed descriptions of known technologies are omitted here.

What is claimed is:

1. A touch functional component, comprising:
   first electrodes, wherein a plurality of the first electrodes are successively distributed in a first direction, at least one first electrode in two adjacent first electrodes comprises an electrode body and an electrode protrusion, and in a same first electrode, the electrode body extends in the first direction to form the electrode protrusion, or the electrode body is in contact connection with the electrode protrusion, wherein two adjacent first electrodes comprise two or more electrode protrusions, and an accommodating area is formed between two adjacent electrode protrusions;

second electrodes, extending in a second direction and at least one of the second electrodes comprising a first electrode structure located in the accommodating area and second electrode structures located on opposing sides of the accommodating area, wherein the second electrode structures bypass the electrode protrusions and extend towards the accommodating area to form the first electrode structure, or the second electrode structures bypass the electrode protrusions and extend towards and are in contact connection with the first electrode structure;

first connection bridges, at least one of the first connection bridges electrically connecting the electrode protrusion of one of two adjacent first electrodes with the electrode body of the other first electrode of the two adjacent first electrodes; and second connection bridges, at least one of the second connection bridges electrically connecting the first electrode structure with the second electrode structure, wherein an orthographic projection of the second connection bridge overlaps at least partially with that of the electrode protrusion.

2. The touch functional component according to claim 1, wherein
each of the first electrodes comprises at least one electrode protrusion on a side close to an adjacent first electrode, and the electrode protrusions of two adjacent first electrodes are opposite in the second direction.

3. The touch functional component according to claim 1, wherein the first connection bridges and the second connection bridges are alternately disposed around the first electrode structure.

4. The touch functional component according to claim 1, wherein in two adjacent first electrodes, one of the first electrodes comprises at least two electrode protrusions on a side close to the other first electrode, the two or more electrode protrusions of a same first electrode are opposite in the second direction, and the accommodating area is formed between the two or more electrode protrusions.

5. The touch functional component according to claim 1, wherein around the first electrode structure, a plurality of the first connection bridges are sequentially disposed, and a plurality of the second connection bridges are sequentially disposed.

6. The touch functional component according to claim 1, wherein the touch functional component further comprises:
third connection bridges, at least one of the third connection bridges electrically connecting two adjacent electrode protrusions.

7. The touch functional component according to claim 1, wherein the first electrode structure comprises a first sub electrode structure and a second sub electrode structure, and a first blank area is formed among the first sub electrode structure, the second sub electrode structure, and the electrode protrusions.

8. The touch functional component according to claim 1, wherein a second blank area is formed between the electrode body and the second electrode structure.

9. The touch functional component according to claim 1, wherein a cross-sectional width of the electrode protrusion increases first and then decreases in the first direction.

10. The touch functional component according to claim 1, wherein in the same first electrode, a cross-sectional width of an end of the electrode protrusion extending towards the electrode body is less than that of an end of the electrode protrusion away from the electrode body.

11. The touch functional component according to claim 1, wherein at least a portion of an orthographic projection of the first connection bridge falls within a first gap, and the first gap is a gap between the electrode protrusion of one first electrode of two adjacent first electrodes and the electrode body of the other first electrode.

12. The touch functional component according to claim 1, wherein an orthographic projection of the second connection bridge overlaps at least partially with that of an end of the electrode protrusion with a minimum cross-sectional width.

13. The touch functional component according to claim 1, wherein the first electrode is one of a sensing electrode and a driving electrode, and the second electrode is the other of the sensing electrode and the driving electrode.

14. A display panel, comprising the touch functional component according to claim 1.

15. The display panel according to claim 14, wherein a length-width ratio of the display panel is 1:M, the first direction is a length direction of the display panel, the second direction is a width direction of the display panel, and M>1.

16. The display panel according to claim 14, wherein a length-width ratio of the display panel is M:1, the first direction is a width direction of the display panel, the second direction is a length direction of the display panel, and M>1.

17. The display panel according to claim 14, wherein a length-width ratio of the display panel is 1:1, the first electrode structure comprises a first sub electrode structure and a second sub electrode structure, and a first blank area is formed among the first sub electrode structure, the second sub electrode structure, and the electrode protrusions.

18. The display panel according to claim 14, wherein a length-width ratio of the display panel is 1:1, and a third connection bridge is disposed between two adjacent electrode protrusions.

19. A display apparatus, wherein the display apparatus comprises the display panel according to claim 14.

* * * * *